July 26, 1938.  W. L. McNAMARA  2,125,079

METHOD AND APPARATUS FOR FEEDING GLASS

Filed Jan. 19, 1935  5 Sheets-Sheet 1

Fig.1.

INVENTOR
William L. McNamara
BY
Norman T. Holland
ATTORNEY

July 26, 1938.  W. L. McNAMARA  2,125,079

METHOD AND APPARATUS FOR FEEDING GLASS

Filed Jan. 19, 1935  5 Sheets-Sheet 2

INVENTOR
William L. McNamara
BY
[signature]
ATTORNEY

July 26, 1938.  W. L. McNAMARA  2,125,079

METHOD AND APPARATUS FOR FEEDING GLASS

Filed Jan. 19, 1935  5 Sheets-Sheet 3

INVENTOR
William L. McNamara
BY
Norman N. Holland
ATTORNEY

Patented July 26, 1938

2,125,079

UNITED STATES PATENT OFFICE 2,125,079

METHOD AND APPARATUS FOR FEEDING GLASS

William L. McNamara, Connellsville, Pa., assignor to Capstan Glass Company, Connellsville, Pa., a corporation of Pennsylvania Application January 19, 1935, Serial No. 2,483

23 Claims. (Cl. 49—55)

The present invention relates to a method and apparatus for feeding molten glass, and more particularly to a method and apparatus for feeding charges of molten glass to fabricating machines for making glass containers, although certain of its features may be utilized for other types of machines.

Glass containers are made of numerous shapes, sizes and artistic designs. One of the features of such containers is their beauty and the attractive packages formed thereby. Packers demand individual and distinctive shapes or designs for their products and frequently different designs for each of their products. As a result, glass factories are obliged to make and carry in stock molds for innumerable designs to accommodate their customers. In actual manufacture, fabricating machines are provided with six or more molds. Hence, the manufacturer must carry in stock at least six molds for each design and at least six molds for each size of package desired by the customer. A single design may be requested to fit any one of a number of sizes of a particular type of cap. In addition, there are numerous types of caps, each one of which usually requires a different glass finish and a special mold therefor.

A substantial investment in mold equipment is, therefore, necessary. In addition, it is necessary to change the six or more molds on the fabricating machines and to readjust the feeding mechanism for each different order for special types, shapes or sizes of containers made. Considerable time is required to change the mold equipment on the fabricating machines and to bring the molds up to proper operating temperatures. As a result, small orders of glassware which require short runs are not only costly to the customer but also unprofitable to the glass factory.

The present invention aims to overcome or minimize these difficulties by permitting long runs in the factory on small orders and also to minimize the mold equipment necessary, the number of mold changes and the time required therefor. These results are achieved herein by providing a method and apparatus for feeding glass adapted to feed charges of different weights seriatim. This permits a glass fabricating machine to be equipped with a set of molds differing from each other so that several sizes or shapes of ware may be made at the same time in the fabricating machine, the feeder being adjusted to deliver to each mold the shape and weight of charge desired for that particular mold.

Another difficulty encountered, particularly with pressure feeders, is the maintenance of accurate weight in the finished articles. This is done at the present time by changing the pressure of air applied to extrude the glass or by changing the intensity of the vacuum for stopping the flow of glass or by changing the length of the period that the pressure or vacuum is effective on the glass. Such adjustments are not satisfactory because of the difficulty in making them accurately and changes are generally necessary every ten or fifteen minutes.

The present invention aims to eliminate or minimize these difficulties by providing a machine which can be readily adjusted with ease and accuracy for controlling the weight of the glass without changing or tampering with the time and pressure adjustments of the feeder. This is important both in a multiple weight feeder, as described herein, and in pressure feeders generally.

An object of the present invention is to simplify the manufacture of glass containers, particularly small quantities thereof.

Another object of the invention is to simplify the operation of glass feeders and particularly feeders for manufacturing glass containers.

Another object of the invention is to provide a method and apparatus for feeding molten glass adapted to deliver charges of glass having a plurality of different predetermined weights.

Another object of the invention is to provide a method and apparatus for feeding glass charges of different weights, whereby the weight of a charge delivered to a particular mold may be changed without changing the weight of the charges delivered to other molds.

Another object of the invention is to provide a method and apparatus for delivering glass charges of different weights to a fabricating machine, wherein the weights of all of the charges may be increased or decreased without changing their relative weights.

A further object of the invention is to simplify the operation of glass feeders, and particularly the weight adjustments therefor.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein.

The drawings illustrate a preferred embodiment of the machine and also one way of practicing the method claimed herein, without any intention of limiting the invention beyond its most comprehensive scope in the art.

In the manufacture of glass, the raw materials, consisting mainly of sand, soda and lime, are melted in a furnace and are maintained in molten condition therein. Such a furnace usually has a number of spouts leading therefrom, commonly known as feeder spouts. These spouts usually have a submerged orifice through which glass is fed to a fabricating machine of proper size and shape to form the particular type of ware.

Figure 1:
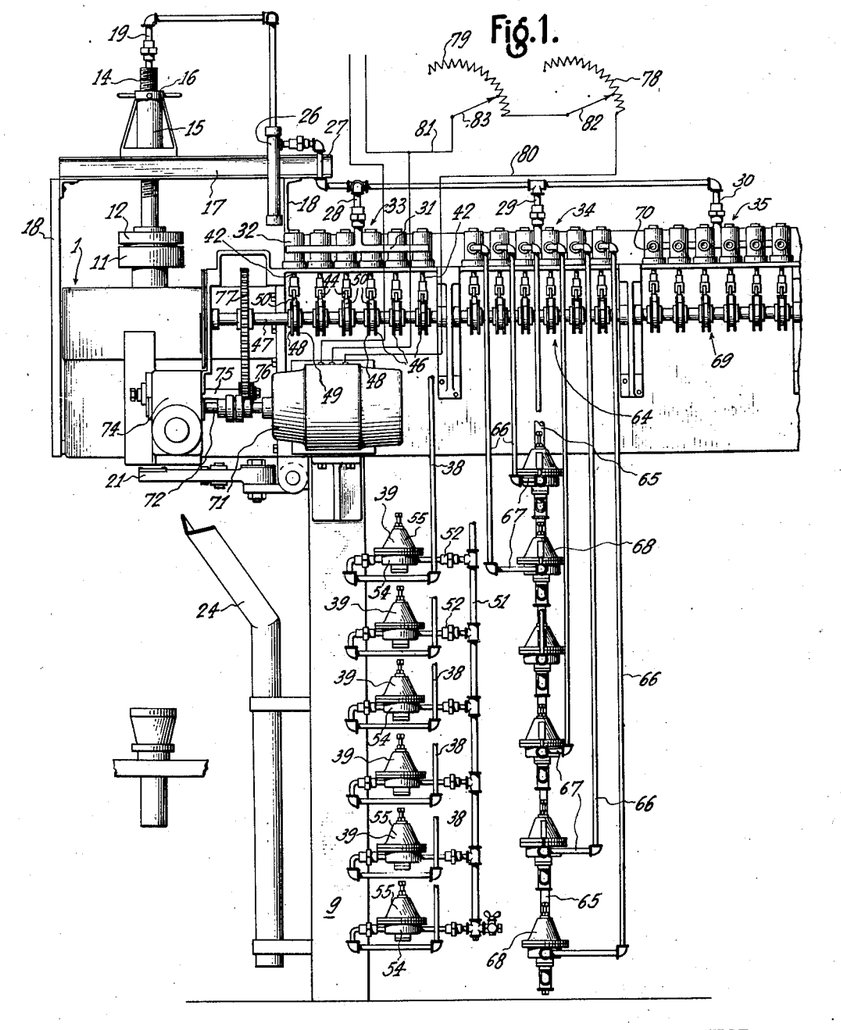
Fig. 1 is a side elevational view of a preferred embodiment of the invention.
Figures 2, 4:
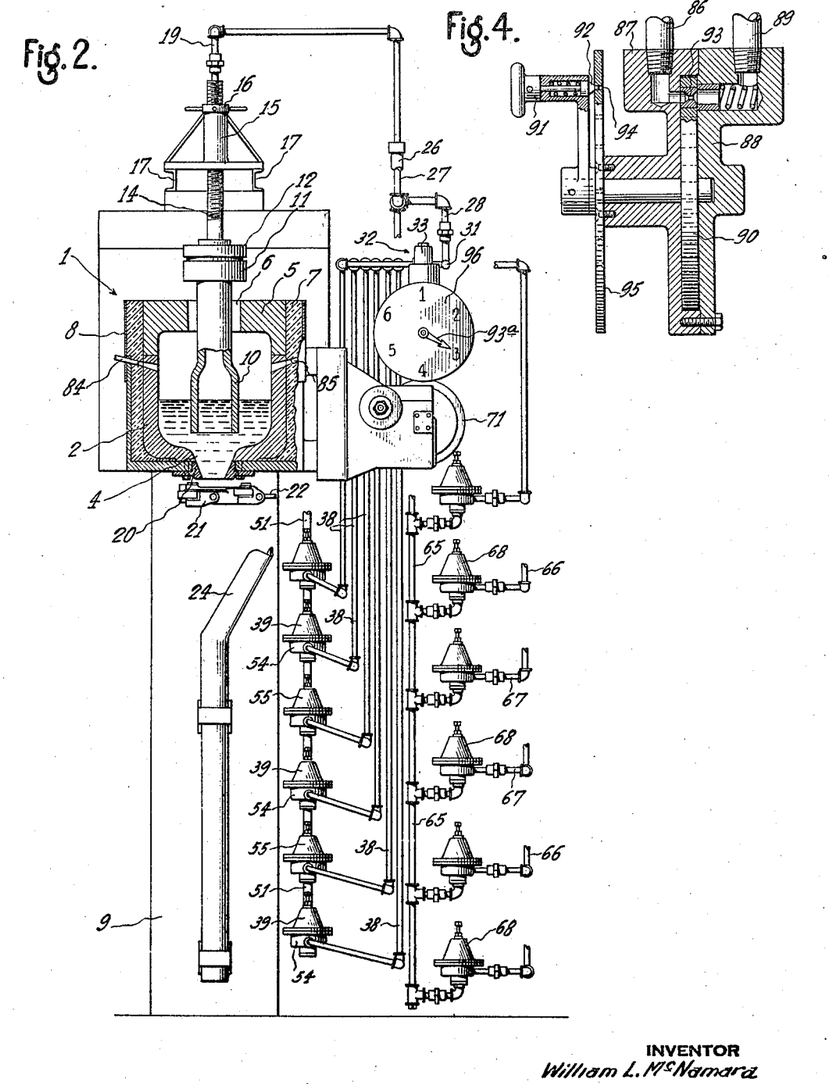
Fig. 2 is an end elevational view, partly in section, of a preferred embodiment of the invention.
Fig. 4 is a sectional view illustrating a preferred embodiment of a temperature controlling device.

Referring again to the drawings, and more particularly to Figs. 1 and 2 thereof, there is a feeder spout 1 attached to a furnace, not shown. The feeder spout may comprise a U-shaped channel member 2 with an orifice 4 in the bottom thereof. Position of the channel member on the side of the glass furnace is substantially at the level of the molten glass in the furnace so that the glass flows through the channel and remains at a substantial height therein to submerge the orifice 4. A suitable cover member 5 may enclose the top of the channel member 2 and may have an aperture 6 therein for the operation of a pressure bell or a needle for controlling the delivery of charges through the orifice 4. Suitable insulating material 7 may surround the channel member and cover therefor and may be held in place by a suitable metallic casing 8. The feeder spout may be suitably supported by a channel member or column 9 which preferably engages the spout intermediate the orifice 4 and the furnace so that the space beneath the protruding end of the spout will be free to permit machines to be placed under the orifice 4.

If no mechanism is provided for regulating the flow of glass through the aperture 4, a continuous stream will result. In order to deliver charges of a proper size and shape for the ware being fabricated, there is provided a bell-shaped member 10 extending down through the aperture 6 in the cover part of the spout with its lower end submerged in the glass directly above the aperture 4 and spaced slightly from the bottom of the channel so that the glass may flow around the bottom through the aperture. The upper end of the bell-shaped member 10 may be secured in a suitable chuck or holder 11, which in turn may be bolted to a member or holder 12 on the end of a threaded rod 14. The upper end of the rod 14 extends through a cylindrical bore in a bracket 15 and has a hand operated nut 16 at the top thereof in engagement with the threaded member 14 to raise and lower it for vertical adjustment of the bell 10 with respect to the bottom of the channel. The bracket 15 may be supported in any suitable manner, for example, by channel members 17 extending across the supporting members 18 on the feeder spout. The threaded rod 14 preferably has a hollow center leading to the bell-shaped member 10 and operatively connected to a conduit or pipe 19 for subjecting the bell 10 and the glass immediately above the aperture 4 to pressure, atmosphere and vacuum for controlling the flow of the glass and for regulating its shape and weight so that charges of glass are formed one after another below the orifice 4. A removable bushing 20 may be provided at the bottom of the orifice for conveniently changing the size of the orifice where a substantially different weight of glass is to be delivered.

A pair of shears 21 is mounted beneath the orifice 4 for severing the stream of glass as the charges are formed below the orifice. These shears may be of any desired type, but preferably are of the type shown in my co-pending application, Serial No. 570,833, and may be raised or lowered for changing the cutting plane. The shears may also be operated in any suitable manner but preferably are connected by means of the rod 22, and suitable connecting links, to a cam on a drive shaft for the mechanism about to be described.

A suitable trough 24 is pivotally mounted below the orifice for catching and guiding the charges or stream of glass delivered when the molds of the fabricating machine are stopped thereunder. When the air pressure in the bell 10 exceeds atmospheric pressure, the glass is forced through the orifice 4 and when vacuum is applied to reduce the pressure in the bell below atmospheric pressure, the flow of glass may be stopped or reversed. The bell may also be opened to atmosphere for relieving either the vacuum or the pressure. By varying the amount of air pressure in the bell and the length of time it is effective upon the glass, the size of the glass charges may be definitely determined and maintained. The preferred embodiment of the present invention contemplates an improved method and means for feeding consecutive charges of glass of the same weight and consecutive charges varying substantially in weight so that the charges may be fed to a machine having all of its molds adapted to form the same shape and size of ware or having each of its various molds adapted to form a different shape and size of ware. The mechanism about to be described and shown more particularly in Figs. 1 and 2 of the drawings, is primarily adapted for feeding charges seriatim, varying substantially in size, to a fabricating machine.

Referring more particularly to Figs. 1 and 2 of the drawings, a pipe 19 is connected to the upper end of a trap 26 to prevent glass from being drawn by the vacuum into the valve mechanisms to be described and the upper end of the trap 26 is connected through pipe 27 to the three branch pipes 28, 29 and 30. The branch pipe 28 connects with a manifold 31, operatively connected through a plurality of cam controlled valves, to be described hereinafter, to a source of pressure whereby the bell 10 is subjected to a series of pressure impulses at proper intervals of time. The branch pipe 29 leads to a manifold (not shown), likewise connected through a plurality of cam controlled valves to a source of vacuum, as described hereinafter, for subjecting the bell 10 to a series of vacuum impulses at suitable time intervals. The branch pipe 30 leads to a manifold connected to a series of valves which open the manifold to atmosphere at suitable timed intervals so that the pressure or vacuum in the bell 10 may be relieved. The valve mechanism for the pressure, the vacuum and the atmosphere lines is substantially the same and the groups of valves therefor are illustrated at 33, 34 and 35, respectively, and, for illustrative purposes, are shown as six in number in each case. All of these valves may be of substantially the same form and are of substantially the same form herein.

Figures 5, 7:
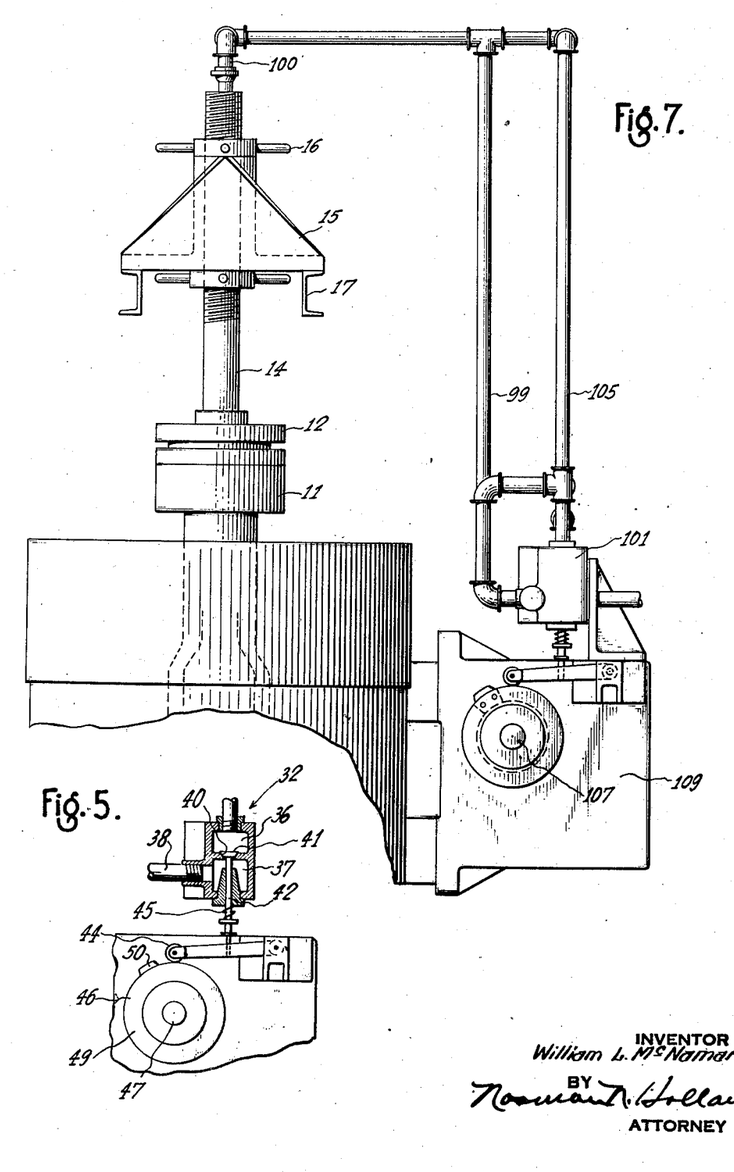
Fig. 5 is a fragmentary detailed view of a preferred form of valve for subjecting the glass to pressure and vacuum.
Fig. 7 is an end elevational view of the embodiment of the invention illustrated in Fig. 6.

A detailed sectional view of one valve is shown in Fig. 5 of the drawings and comprises an upper chamber 36 connected to the common manifold 31 for all of the pressure valves, and a lower chamber 37 operatively connected, through pipe 38, to a pressure regulating valve 39. Intermediate the two chambers 36 and 37 is a valve seat 40 with a poppet valve 41 thereon having a valve stem 42 provided with a cam roller 44 at its lower end. The valve is maintained in its closed position by means of a coiled spring 45, as shown and a suitable cam 46 mounted on a rotating cam shaft, opens the poppet valve at intervals, preferably once during each complete rotation of the cam shaft 47. Preferably, the cam 46 comprises two discs 48 and 49 having a cam member 50 bolted therebetween and adjustable in position. As the poppet valve is opened by the cam, the bell 10 is subjected to the pressure conditions within the pipes 19, 27, 28, and manifold 31 to apply the desired amount of air pressure thereto. The contour of the cam member 50 may be sufficiently large to keep the pressure applied for any desired period. The pipe 38 for supplying the pressure to the lower chamber 37 of the valve may be connected to any suitable source of pressure, such as a compressed air tank. Since it is inconvenient to have six different pressure tanks, the present invention contemplates connecting each of the pressure valves to the same pressure tank or pressure line 51, through a series of regulator valves 39. These regulator valves may be of the same construction and a description of one will serve for all.

Figure 3:
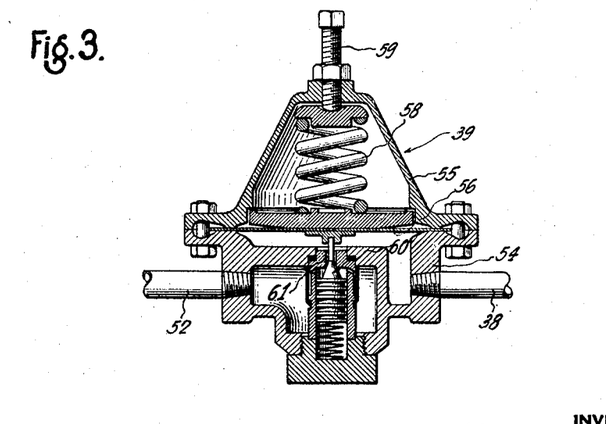
Fig. 3 is a sectional view, illustrating a pressure regulating valve.

Referring more particularly to Fig. 3, there is shown a detailed view of the regulator valve 39, which preferably comprises a bottom member 54 and a top member 55 bolted together with a diaphragm 56 therebetween. Pressure is admitted through the pipe 52 leading from the pressure line 51 at one side of the lower valve part 54 and the other side of the lower valve part is connected to the pipe 38. A spring 58 is provided in the upper valve part 55 for holding the diaphragm down and a set screw 59 is threaded into the valve part 55 for varying the tension of the spring. A valve member 60 is operatively associated with the diaphragm 56 and is adapted to open and close a duct or conduit 61 communicating pressure between the respective sides of the lower valve parts having pipes 38 and 52 connected thereto. When the pressure in the pipe 38 decreases sufficiently so that the spring 58 can press the diaphragm 56 downward, the spring 58 will move the diaphragm downward and with it the valve member 60 connecting the pipe 52 directly with the pipe 38, through the conduit or duct 61. The pressure in pipe 38 will then be built up until it counterbalances the spring pressure 58 and forces the diaphragm 56 upwardly to close the valve 60. The effectiveness of the spring 58 may be increased or decreased by means of the set screw 59, so that the pressure in the line 38 may be maintained at any desired amount. By using a series of regulating valves 39, the operation of the machine may be rendered substantially independent of variations in the main pressure line. In addition, the pressure delivered to each individual valve may be regulated independently merely by adjusting the set screw 59 and increasing or decreasing the compression in the spring 58.

As shown in the drawings, there are six valves controlled by six independently adjustable cams on the cam shaft 47 and operatively connecting the bell 10 to the pressure line 51 through the six pressure regulators 39. It will be understood, of course, that if the fabricating machine has more or less than six molds, the number of valves and regulators should be changed accordingly, the present machine being illustrative of the invention applied to a feeder adapted to deliver charges of glass to a six mold fabricating machine.

The mechanism just described is for subjecting the bell 10 and the glass thereunder to pressure. The mechanism for subjecting the bell 10 and the glass thereunder to vacuum is substantially the same. The branch pipe 29 is connected to a manifold common to a group of six valves 34 corresponding to the group 33 described in connection with the pressure lines. It is not believed necessary to describe one of these valves, since it is similar in all respects to the valve 32, shown in Fig. 5, including the operation thereof by means of a group of six cams 64 similar to the cam 49. Each of the valves in the group 34 is connected to a vacuum line 65 through pipes 66 and 67 and regulators 68. The regulators 68 may, for illustrative purposes, be identical in all respects with the regulator 39, shown more particularly in Fig. 3, except that the spring 58, instead of being compressed, is a tension spring tending to pull the diaphragm 56 upwardly to counteract the downward pull in the vacuum line and the valve 60 controlling the duct 61 is at the opposite end of the duct. Also, as described in connection with the pressure regulating mechanism, there is a separate regulator 68 for each one of the six valves 34, so that the vacuum to which the bell 10 is subjected when the respective poppet valves open is substantially independent of the degree of vacuum in the vacuum line 65.

The mechanism for opening the bell 10 to atmosphere likewise comprises a plurality of valves 35, each of which corresponds to the valves 32 described in detail in Fig. 5 in connection with the pressure mechanism. These valves are also controlled by a corresponding group of cams 69 operating each valve independently. The lower chambers of the respective valves, instead of being connected to a pressure or vacuum line, are opened to atmosphere through the apertures 70 in the lower chambers 37 thereof. In this way each valve may subject the bell 10 to atmosphere for any desired period of time and by adjustment of the cams 46 the time relation of the pressure vacuum and atmosphere periods including the beginning and ending of each with respect to the others may be changed as desired.

Any suitable driving mechanism may be utilized for the machine. As here shown, an electric motor 71 is operatively connected through a shaft 72, reduction gear 74, shaft 75 and gears 76 and 75

71, to the cam shaft 47, which drives the three groups of six cams each at the same speed. As described hereinbefore, the motor also operates, through a cam not shown, the shears for severing the glass charges after they are formed so that the shears are operated in timed relation with respect to the cams controlling the times at which pressure, vacuum and atmosphere are communicated to the bell 10. The motor 71 preferably controls the operation of the fabricating machine so that it will rotate in timed relation to the operation of the poppet valves and the shears. In the preferred embodiment of the invention, the change in the speed of the motor 71 preferably changes the speed of the operation of all of the parts of the feeder and also of the fabricating machine.

With the mechanism thus far described, it is necessary to change the adjustment of the cams 46 or the pressure regulators 39 for changing or maintaining the desired weight of the charges being delivered. Such changes for correcting the weight of the glass delivered are usually occasioned by changes in the condition of the molten glass being fed and would require a corresponding adjustment of all charges delivered. This would mean a simultaneous adjustment of the cams or of the regulating valves 39. Since such changes have to be made at frequent intervals, such adjustments would not be practical although the adjustments of the regulating valves may be made to correct the weight of a particular mold or molds where certain of the charges delivered and the ware fabricated are of proper weight and others are not. The present invention overcomes this difficulty by providing a pair of rheostats 78 and 79 for increasing or decreasing the resistance in the field of the motor, or if desired, in the armature thereof. As shown in Fig. 1, the rheostats are connected in the field of the motor through the leads 80 and 81. The regulation of the rheostats which are shown in series, is illustrated diagrammatically by the pointers 82 and 83. Preferably, one of the rheostats has much smaller graduations than the other rheostat so that substantially large variations may be made by changing one pointer and smaller ones by changing the other pointer. In this way, very accurate adjustments of speed may be made and since the shears, the pressure control devices and the fabricating machine are all controlled by the motor they are speeded up or slowed down corresponding to the change in the speed of the motor. By increasing the speed of the motor, the time that the pressure is applied to the glass is decreased and if the speed of the motor is decreased, the time that the pressure is applied is increased and hence, the weight of the charges of glass is increased. In this way, very quick adjustments in weight may be made and the adjustment applies to all of the charges being fed and not to the charges being fed to a particular mold. Naturally, it is desired to operate the machine at its capacity speed and not to reduce the speed of the machine materially below the regular operating rate or to increase it above that rate, because, in the first case, production is decreased and, in the second case, undesired strains are placed on the machinery.

To permit the weight of the delivered charges to be maintained substantially constant by changing the speed of the machine without occasioning undue variations in the speed of the machine, there are provided suitable burners 84 and 85 effective upon the glass in the feeder spout. The fuel for these burners is controlled by a mechanism shown in Fig. 4. The fuel line 86 is attached to a plate 87 which, in turn, is bolted to a plate 88 having an outlet fuel line 89. A rotating disc 90 intermediate the two plates 87 and 88, has a series of graduated apertures 93 therein adapted to be brought into registry with the conduit connecting the pipes 83 and 89. This disc 90 may be operated by a handle 91 having a projection 92 thereon adapted to fit in suitable apertures 94 in a stationary plate 95. By means of the handle 91, the disc 90 may be rotated to place any sized aperture desired in the fuel line, thereby controlling very accurately the flow of fuel to the burner. When the speed adjustments, necessary to maintain the weight of the glass delivered constant, change the speed materially from the desired operating rate of the machine, the fuel delivered to the burners is increased or decreased to require changes in speed which will bring the speed back to normal in order to keep the weight constant; for example, if the speed is too low, the fuel delivered to the burners is increased to increase the temperature of the glass. If the speed of the machine is too high, the fuel delivered to the burners is decreased to lower the temperature of the glass in the spout. In this way, the speed of the machine may be maintained within predetermined limits and, at the same time, utilized for controlling the weight of the charges delivered.

For convenience to the operator, a plate 96, with numbers corresponding to the molds on the fabricating machine, is attached at the end of the cam shaft 47 with a pointer 93a rotating with the cam shaft to indicate which mold is being fed in each instance. This facilitates individual adjustments of weight for a particular mold.

In operating the machine and in practicing the method, a bushing of suitable size for all of the glass charges to be delivered is placed in the orifice 4. The bell 10 is adjusted to the proper position above the orifice to obtain best results. The cams on the cam shaft 47 are adjusted to apply pressure through the poppet valves for the desired period with respect to each mold to which charges are to be delivered. The cams on the shaft 47 are, likewise, adjusted for the vacuum valves and for the atmosphere valves. The pressure regulators are then adjusted to furnish each valve with the desired amount of air pressure. Similar adjustments are made with respect to the vacuum regulators to furnish each of the poppet valves controlling the vacuum with a suitable degree of vacuum. After these adjustments are made, the feeder is started and charges are delivered to the fabricating machine and carefully checked and further adjustments made, particularly in connection with the individual pressure and vacuum regulators, to obtain the proper weight for the charges delivered to each mold in the fabricating machine. After the individual adjustments have been made, further adjustments to correct for weight are made by changes in the speed of the machine by means of the rheostats 78 and 79, the speed of the machine being increased to decrease the weight of the charges delivered and decreased to increase the weight of the charges delivered. When the speed of the machine varies a predetermined amount from the desired speed, the temperature of the glass in the spout is increased or decreased by means of the fuel control illustrated in Fig. 4 of the drawings, thereby increasing or decreasing the temperature of the glass so that the speed of the machine may be brought back to normal. If the speed is too fast, the temperature is reduced, and if the speed of the machine is too slow, the temperature of the glass is increased.

By regulating the air pressure and vacuum and their time of application, a charge of any desired size may be delivered, since individual cams are provided for the individual molds on the glass machine and individual pressure and vacuum regulators are provided for the individual molds of the glass machine, the feeding of each mold may be treated as an independent operation and in this way the feeder may be adjusted to feed one size and shape of charge to one mold and a different size and shape of charge to the next succeeding mold and a series of different types of ware may be molded on the same fabricating machine fed by the present feeder.

If a glass factory has a small order of a particular type of ware, it is merely necessary to change a single mold on the fabricating machine and the adjustments of the pressure and vacuum applied to the feeder for feeding that particular mold, and the ware may be fabricated at the same time that other types of ware are being fabricated for other customers. In this way, less equipment is necessary and a longer run may be had. For example, if six molds were used for manufacturing the particular order, the run would only be one-sixth as long as where six orders are run with a single mold for each order.

Figure 6:
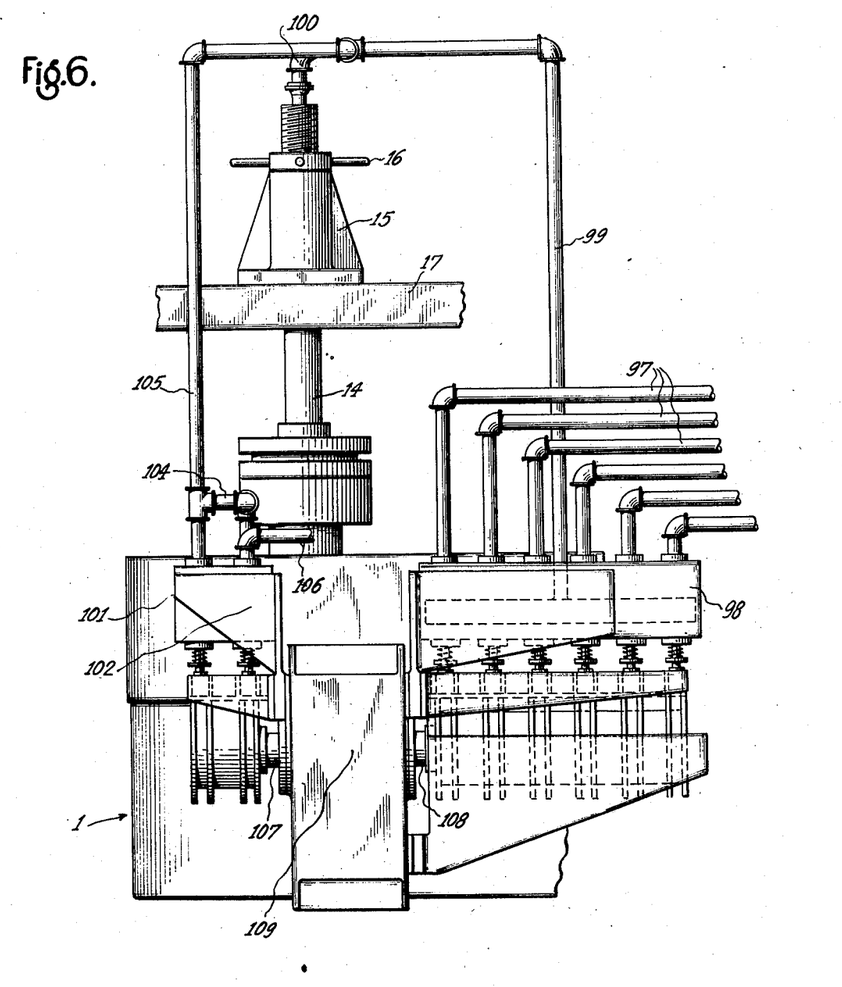
Fig. 6 is a side elevational view of another embodiment of the invention.

Referring more particularly to Figs. 6 and 7 where a slightly different construction is shown, the pressure to the six pressure lines 97 is regulated by suitable regulators 39, described hereinbefore, and the pressure lines lead to six individual poppet valve 98 and through pipes 99 and 100 to the bell 10. The machine, however, differs from that described hereinbefore in that the vacuum and atmosphere lines do not have individual poppet control valves for each mold, but have single poppet valves 101 and 102, respectively, connected through pipes 104 and 105 and 100 to the bell 10. The vacuum line 106 has a single regulator corresponding to the regulator 68. It will be understood, of course, that the poppet valves 101 and 102 have to be operated six times as fast as each of the individual pressure valves 98, therefore, the cam shaft 107 for the valves 101 and 102 should operate six times as fast as the cam shaft 108 which rotates the cams for operating the poppet valves 98. A suitable reduction gear 109 is provided intermediate these cam shafts to effect the necessary reduction in speed.

The mechanism in Fig. 6 may be utilized to obtain the same results described hereinbefore. Since there is an individual pressure line corresponding to each mold on the fabricating machine, the pressure applied and the period that it is applied can be changed to feed charges of different sizes. The regulation of the pressure alone is sufficient to obtain good results, the vacuum and atmospheric periods being the same in connection with each mold. Since the separate valves, cams and regulators for the vacuum and the separate valves and cams for the atmosphere are eliminated, the cost of the construction is less. The regulation is done by changes in the pressure and the period of application thereof while maintaining the periods for the vacuum and atmosphere substantially constant for all the molds.

If desired, the pressure and vacuum may be individually controlled and a single valve for the atmosphere utilized. The mechanism operates in the same manner as described hereinbefore with reference to the preferred form except that there is no individual adjustment for the respective molds with respect to the atmosphere periods.

Figure 8:
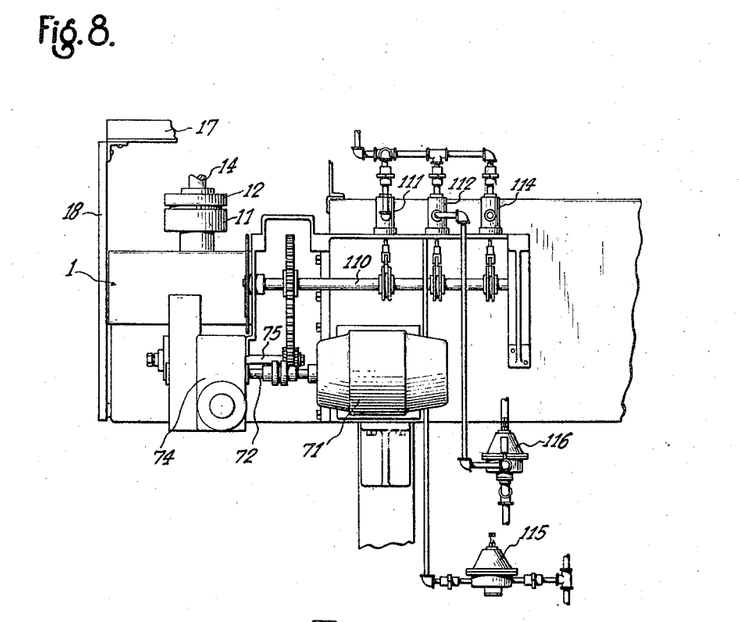
Fig. 8 is a top plan view of a third embodiment of the invention.

A further modification is shown in Fig. 8, wherein all of the molds on the fabricating machine are adapted to produce the same type and weight of ware. In such a case, the individual adjustments for each particular mold are not essential. In this construction, a cam shaft 110 operates the three poppet valves 111, 112 and 114 for pressure, vacuum and atmosphere. Suitable regulators 115 and 116, corresponding to those described hereinbefore, are utilized for controlling the degree of pressure and the degree of vacuum supplied to the valves 111 and 112 and to the bell 10. The cam shaft 110 is driven by the motor 71 as described hereinbefore. While this embodiment does not have the advantage of feeding to a fabricating machine charges varying in weight coresponding to the different sizes of ware made on each mold, it illustrates certain features of the invention applied to the usual types of fabricating machines.

The operation of the modifications described will be clear from the operation of the preferred embodiment which is fully described hereinbefore.

In the construction of the feeder provision is preferably made for mounting and operating a bell above the orifice 4 to control the delivery of charges therethrough.

It will be seen that the present invention provides a glass feeder adapted to feed charges varying in size, whereby a fabricating machine may be fed with the molds thereon adapted to make ware varying in size and shape. In this way, the number of molds required for making small runs of ware are minimized and the changes in the machinery necessary for making the ware are simplified and minimized. The equipment and molds required to be carried in stock in glass factories are reduced to a minimum. The machine is simple in construction, easy to adjust and operate, and fully capable of withstanding the rough usage to which it may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. The method of feeding molten glass charges of substantially constant weight, which method comprises maintaining a supply of molten glass over an orifice, subjecting the glass over the orifice to pressure above atmospheric pressure for forcing the glass out of the orifice and to pressure less than atmospheric pressure to restrict the flow, severing the successive charges below the orifice, and correcting for conditions which tend to produce variations in the weight of charges by changing the frequency of severing and of the application of pressures within predetermined limits to make relatively rapid changes in the weight and by changing the temperature of the molten glass to permit the frequency to remain within said predetermined limits.

2. The method of feeding molten glass, which method comprises maintaining a supply of molten glass over an orifice, subjecting the glass over the orifice to pressure above atmospheric pressure for forcing the glass out of the orifice, successively varying the intensities of the pressures applied to the glass in forming successive charges in a predetermined cycle to feed a group of charges differing a predetermined amount in weight from which containers of different sizes and shapes may be formed, and regulating the weight of each charge in the group collectively by changing the temperature of the molten glass being fed.

3. The method of feeding molten glass, which method comprises maintaining a supply of glass in a reservoir having a submerged outlet, and subjecting the glass over the outlet to a cycle of substantially different successive air pressures below atmospheric pressure to obtain a group of successively formed charges of glass differing a predetermined amount in weight.

4. In a device of the class described, the combination of a feeder spout having a submerged orifice therein, a plurality of conduits for applying air pressures of different intensities periodically to the glass over the orifice to subject the glass to pressures of different intensities and to feed successive charges varying substantially in size, valves in said conduits, a plurality of cams for operating said valves, and a common adjustment for varying the weights of all of said plurality of charges to compensate for changes in the temperature of the glass.

5. In a device of the class described, the combination of a feeder spout having a submerged orifice therein, a plurality of conduits for subjecting the glass above the orifice periodically to cycles of pressure impulses for predetermined periods and of different intensities below atmospheric pressure, to feed a cycle of successively formed charges varying substantially in size, and separate adjusting means effective upon the respective conduits to change the weight of any one charge of a cycle of charges of different sizes.

6. In a device of the class described, the combination of a feeder spout having a submerged orifice therein, means for subjecting the glass above the orifice periodically to pressure impulses below atmospheric pressure, to feed successive charges varying substantially in size, the intensity of successive impulses varying a predetermined amount from a preceding impulse to feed groups of charges with the weight of certain charges differing a predetermined amount from the weight of other charges and a common adjustment for varying the weights of all of said charges a predetermined amount.

7. In a device of the class described, the combination of a feeder spout having a submerged orifice therein, a plurality of conduits for subjecting the glass above the orifice periodically to predetermined pressures of different intensities below atmospheric pressure, to feed a plurality of successive charges varying substantially in size, a valve in each of said conduits, and a plurality of cams for operating said valves, a separate adjustment to change the weight of any one charge independently of the weight of the other charges, and a common adjustment for varying the weights of all of such charges a predetermined amount.

8. In a device of the class described, the combination of a feeder spout having a submerged orifice therein, a plurality of conduits for applying cycles of successive impulses greater than atmospheric pressure periodically to the glass over the orifice, a plurality of conduits for applying air pressure less than atmospheric pressure to the glass over the orifice, and means varying the pressure applied during each impulse of a cycle in a predetermined order to apply pressure impulses of different intensities to feed a group of successively formed charges of glass varying a substantial predetermined amount in size and weight.

9. In a device of the class described, the combination of a feeder spout having a submerged orifice therein, a plurality of conduits for applying air pressures of different intensities greater than atmospheric pressure periodically to the glass over the orifice, and a plurality of conduits for applying air pressure less than atmospheric pressure to the glass over the orifice to feed successive charges of glass varying substantially in size and weight, and pressure regulating means for changing the weight of each of said plurality of charges of different weights independently of the other charges.

10. In a device of the class described, the combination of a feeder spout having a submerged orifice therein, a plurality of conduits for applying air pressures of different intensities greater than atmospheric pressure periodically to the glass over the orifice, and a plurality of conduits for applying air pressures of different intensities less than atmospheric pressure to the glass over the orifice to feed successive charges of glass varying substantially in size and weight, and adjusting means for varying the weights of all of said charges simultaneously to compensate for changes in the temperature of the glass.

11. In a glass feeder of the class described, the combination of a feeder spout having a submerged orifice therein, means for applying air pressures of different intensities greater than atmospheric pressure periodically to the glass over the orifice, and means for applying air pressures of different intensities less than atmospheric pressure to the glass over the orifice, to feed a plurality of successive charges of glass varying substantially in size and weight, individual pressure regulating means to change the weights of any one of said plurality of charges, means for changing the speed of the feeder within predetermined limits to regulate the weights of all of said plurality of charges without material change in their relative weights, and means for changing the temperature of the glass to permit said speed changes for the regulation of weight to be kept within predetermined limits.

12. In a glass feeder of the class described, the combination of a feeder spout having a submerged orifice therein, conduits leading to said spout for subjecting the glass over said orifice to pressures of predetermined different intensities to feed groups of charges with the charges in a group having predetermined differences in weight corresponding to said different intensities, a plurality of cams for controlling the time that said pressures are effective on the glass, and means for changing the speed of the feeder to regulate the weights of all of the charges of the groups and means for changing the temperature of the glass to permit the changes in the speed of the feeder for the regulation of the weight of the charges to be kept within predetermined limits.

13. In a device of the class described, the combination of a reservoir having a submerged outlet therein adapted to deliver charges of molten glass, a bell having its lower end submerged in said glass, a plurality of conduits operatively connected to said bell to supply a plurality of pressures thereto above atmospheric pressure and differing in intensity, a plurality of conduits adapted to subject the interior of the bell to partial vacuums of different intensities, a plurality of conduits operatively connected to said bell adapted to subject the interior of the bell to atmospheric pressure, valves in each of said conduits, and a plurality of cams for controlling the operation of the valves in each of said conduits.

14. In a glass feeder, the combination of a reservoir having a submerged outlet therein adapted to deliver charges of molten glass, a bell having its lower end submerged in said glass, a plurality of conduits operatively connected to said bell to supply a plurality of pressures thereto above atmospheric pressure and differing in intensity, a plurality of conduits adapted to subject the interior of the bell to partial vacuums of different intensities, a plurality of conduits operatively connected to said bell adapted to subject the interior of the bell to atmospheric pressure, valves in each of said conduits, a plurality of cams for controlling the operation of the valves in each of said conduits, and means for changing the speed of the drive for said feeder and said cams to change the weights of the charges delivered a predetermined amount without changing their relative weights.

15. The method of feeding molten glass charges of substantially constant weight and of correcting for conditions which tend to produce variations in the weight of the charges, which method comprises maintaining a supply of glass over an orifice, subjecting the molten glass over the orifice to fluid pressure above atmospheric pressure for forcing the glass out of the orifice and to fluid pressure less than atmospheric pressure to restrict the flow through the orifice, severing the successive charges below the orifice, and maintaining the weight of successive charges substantially constant by changing the frequency of applications of pressures within predetermined limits without changing their phase relation.

16. The method of feeding molten glass for charging the molds of a glass fabricating machine, which method comprises maintaining a supply of glass in a reservoir having a submerged outlet, subjecting the glass over the outlet to cycles of successive air pressures of predetermined durations and of substantially different intensities to form a group of successively formed charges for the molds of the glass machine differing a predetermined amount in weight, and also subjecting the glass over the outlet to a partial vacuum between the succesive pressure impulses.

17. In a device of the class described, the combination of a feeder spout having a submerged orifice therein, a plurality of conduits for applying positive air pressures of predetermined different intensities to the glass over the orifice, a plurality of cams for controlling the period said pressures are effective on the glass, and pressure regulating valves in said conduits to apply said pressures of different intensities from a single source of supply.

18. In a device of the class described, the combination of a feeder spout having a submerged orifice therein, a plurality of means for producing air pressures of different intensities, a plurality of conduits connected to said means and leading to said spout for subjecting the glass above the orifice to said pressures of different intensities, valves in each of said conduits and a cam for each valve for controlling the time that each of said pressures of different intensities is effective on the glass with only one of said cams effective upon each individual charge of glass fed.

19. The method of feeding molten glass, which method comprises maintaining a supply of glass in a reservoir having a submerged outlet, and subjecting the glass over the outlet to a cycle of successive air impulses above atmospheric pressure of predetermined differing intensities to force the glass through said outlet and to form a group of successively formed charges differing a predetermined amount in weight.

20. In a device of the class described, the combination of a feeder spout having a submerged orifice therein and means for applying cycles of successive pressure impulses of predetermined durations and of predetermined differing intensities periodically to the glass over the orifice to subject the glass to cycles of pressure impulses of different intensities, thereby to feed groups of charges, the charges of a group varying substantially in size.

21. In a device of the class described, the combination of a feeder spout having a submerged orifice therein, a plurality of conduits for applying a plurality of predetermined air pressures periodically and successively to the glass over the orifice to subject the glass to cycles of pressure impulses of predetermined different intensities and to feed groups of successively formed charges varying substantially in size, and independent adjustments for said conduits to change the pressure of any one of said plurality of pressures to change the weight of any one charge in a group.

22. The method of feeding molten glass charges of substantially constant weight, which method comprises maintaining a supply of molten glass over an orifice, subjecting the glass over the orifice to fluid pressure above atmospheric pressure to force the glass out of the orifice and to fluid pressure below atmospheric pressure to restrict the flow, severing the successive charges below the orifice, and correcting for conditions which tend to produce variations in the weight of charges by changing the frequency of the application of pressure.

23. The method of feeding charges of molten glass of substantially constant weight and of correcting for conditions which tend to produce variations in the weight of the charges, which method comprises passing molten glass over an orifice, subjecting the molten glass over the orifice to fluid pressure above atmospheric pressure for forcing the glass out of the orifice and to fluid pressure less than atmospheric pressure to restrict the flow, maintaining the weight of successive charges substantially constant by varying the frequency of applications of pressures within predetermined limits, and changing the temperature of the molten glass being fed to make slow changes in weight which will permit resumption of substantially the normal frequency of the applications of pressures.

WILLIAM L. McNAMARA.